3,425,115
METHOD AND APPARATUS FOR MAKING PEAS-IN-A-POD NUCLEAR REACTOR ELEMENT
Joseph Henry Handwerk, Joliet, and David E. White, Maywood, Ill., assignors to the United States of America as represented by the United States Atomic Energy Commission
Filed May 20, 1964, Ser. No. 369,033
U.S. Cl. 29—421
Int. Cl. B23p *17/00, 19/00;* B21d *39/00*
3 Claims

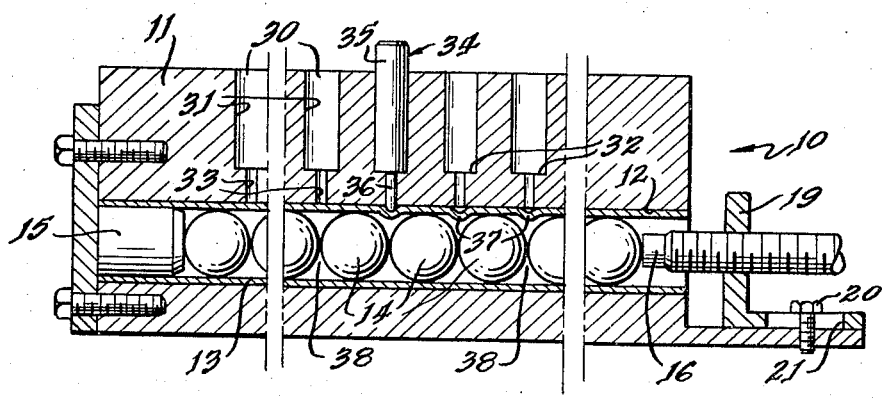
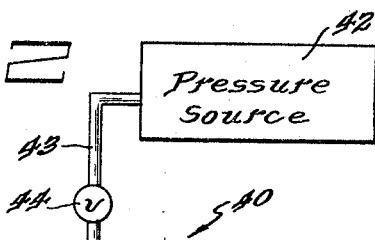
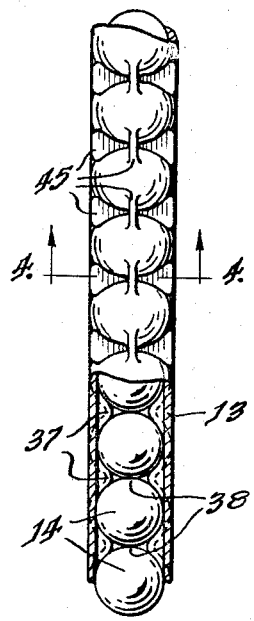
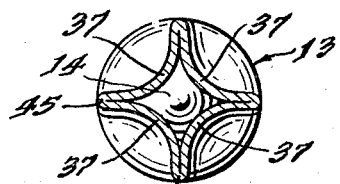
INVENTORS
Joseph H. Handwerk
David E. White
BY
Roland G. Anderson
Attorney United States Patent Office 3,425,115
Patented Feb. 4, 1969

ABSTRACT OF THE DISCLOSURE

Method of and means for producing a fuel element for a nuclear reactor. A metal tube is filled with spherical fuel bodies of diameter about equal to the inner diameter of the tube, a punch is used to create indentations in the tube between the fuel bodies in a regular pattern, the tube is sealed at the ends and subjected to isostatic pressure to collapse the tube about the spherical bodies.

---

The invention relates to an improved nuclear reactor fuel or blanket element and to a method and apparatus for making the same, more particularly to an element of the peas-in-a-pod type as it is generally called, with superior mechanical strength and resistance to bending brought about by our method of making, employing our novel apparatus.

Many recent nuclear reactor designs call for ceramic fuels and blanket materials such as the oxides, carbides, nitrides, sulfides and other such compounds of the actinide elements, either alone or within a matrix of metal or ceramic. This is due to the superior chemical and thermal stability of ceramics as compared to metal, and even more important, their resistance to distortion or "growth" under irradiation. However, such materials have inferior heat transfer properties as compared to metals. Hence, efforts are being directed to the development of fuel and blanket elements which will compensate for this shortcoming.

One of the elements of the kind just mentioned is known as the peas-in-a-pod type. It consists of an elongated metal tube filled with a plurality of spheres, or other such geometric shapes, of fuel or blanket material, the diameter of the spheres being equal to, or slightly less than the inner diameter of the tube. The tube is collapsed, or shrunk around the spheres somewhat like a pod of peas when it is dried and the spherical shapes of the peas inside it become visible. By "other geometric shapes" is meant other shapes similar to spheres such as ellipsoils of revolution, prolate and oblate, flattened spheres, elongated spheres, and spheres with a raised band around the middle.

The reasoning behind this collapsed, or shrunken, tube configuration was that by increasing the area of contact and the pressure between the tube and the spheres heat transfer would be improved. While this is correct, the constrictions between the spheres along the length of the tube weaken it mechanically; in fact, elements of this kind, even when made of rather thick-walled tubing, bend so easily that their use in nuclear reactors is considered impractical.

It is, accordingly, the general object of the invention to provide a nuclear reactor element of the peas-in-a-pod type with improved mechanical strength and resistance to bending.

It is a concurrent object to provide a method of making such elements.

It is a second concurrent object to provide an apparatus for carrying out the above method.

Other objects will appear as the description proceeds.

According to the invention, a tube filled with spheres or other such shapes is placed in an apparatus which holds it in a fixed alignment beneath a straight row of holes directly over the points of tangency between the shapes within the tube. Limited, equal thrusts by a punching tool are brought to bear through the holes against the tube in order to produce places of weakness, or indentations; the tube is rotated and the process repeated until the outside wall of the tube has a pattern of equally spaced lines of limited, equally spaced inward indentations. The tube is then sealed at the ends and subjected to isostatic pressure whereupon the walls of the tube give way in a regular pattern following the pattern of the inward indentations, collapsing or shrinking closely around the spheres in the regions of the indentations, but standing out in straight ridges midway between the lines of indentations. These ridges, being thus accurately aligned along the entire length of the tube act to retain the bending strength of the tube, at least to an extent greatly in excess of that of fuel elements made by previous methods. In the latter the ridges between the depressions tended to be arranged in rather random fashion; even though in some instances they might be aligned for a considerable distance, this rarely was carried out through the entire length of the tube.

Reference is now made to the drawings, FIG. 1 of which is a sectional view of our apparatus for placing a pattern of indentations on the walls of a tube.

FIG. 2 is a sectional view of an apparatus for collapsing the walls of the tube according to the pattern imposed in the apparatus of FIG. 1.

FIG. 3 is a partly broken away longitudinal view of our improved peas-in-a-pod reactor element.

FIG. 4 is a sectional view of the same along the line 4—4 in FIG. 3.

In FIG. 1 the numeral 10 designates our apparatus generally. It consists of a fixture having a body 11 in which there is a longitudinal bore 12 into which a tube 13 snugly fits.

Within the tube 13 is a plurality of spheres 14 having diameters about equal to the inner diameter of the tube 13 or slightly less. Spheres 14 are held in place by end plug 15 and adjustable stop 16. End plug 15 has been placed in a fixed position in the tube, such as by welding, and adjustable stop 16 is threaded through bracket 19, which is adjustably held in place by set-screw 20 within slot 21.

In the upper part of body 11 is a plurality of equally spaced, aligned holes 30, each having an upper bore 31, an annular shoulder 32, and a lower bore 33, which is considerably smaller than upper bore 31. The centers of holes 30 are equally spaced apart by a distance equal to the diameter of spheres 14 for reasons that will become apparent shortly. A punching tool 34 fits snugly and slidably within the bores 31 and 33, having an upper shaft 35 which fits within upper bore 31 and is considerably longer, and a lower shaft 36 which fits within lower bore 33 and is slightly longer. Since upper shaft 35 strikes against shoulder 32, punching tool 34 is capable of making an indentation 37 of only limited depth in the tube 13. It will be noted that the axes of holes 30 are all directly above the points of tangency 38 of spheres 14, and the indentations 37 in the tube 13, made by striking the top of punching tool 34, are accordingly located over the same points of tangency 38.

When the punching tool 34 has been placed in all the holes 30 and struck so as to make a complete line of indentions 37, tube 13 is rotated within the bore 12 through 360 degrees divided by some whole number, such as 3, 4, 5, 6, and the like, depending on the configuration of the tube 13 desired, and the punching operation is repeated until the entire outside of the tube, or at least the part containing spheres or shapes, is covered with a pattern of indentions 37 in equally spaced parallel rows in both the longitudinal and circumferential directions. In the example of FIGS. 1, 3 and 4 the division number is four, or, in other words, the tube is rotated through 90 degrees between each line of indentations, which results in four equally spaced, parallel, longitudinal lines, and a number of circumferential rows equal to the number of holes in the fixture 10. The latter rows are, of course, equally spaced, parallel and at right angles to the longitudinal rows.

The tube 13 is then removed from the fixture 11, partially evacuated and a plug 39 is inserted in the end of the tube 13 opposite the end having plug 15. The plug 39 is pressed against the line of spheres 14 sufficiently to bring them into tangency with each other and, in the case of the end sphere, with plug 15, and plug 39 is then sealed, as by welding. Since plug 15 was in a fixed position while the indentations 37 were made in fitting 11, the indentations 37 and the points of tangency 38 are then fixed in the same relationship as in the fitting 11, that is to say, each point of tangency 38 is in the same plane normal to the axis of tube 13 as the four indentations 37 made above it in the fitting 11. The partial evacuation referred to should be efficient to prevent rupture of the tube when it is collapsed, or shrunk around spheres 14, as will next be described.

Tube 13 is next placed in a hydrostatic pressure apparatus designated generally at 40. It consists of a pressure chamber 41 filled with a pressing medium such as oil, glycerin, water and the like, connected to a pressure source 42 by a conduit 43 in which there is a control valve 44. On sealing the chamber 41 and opening valve 44 isostatic pressure is exerted on the walls of tube 13 so as to cause indentations 37 to deepen and shrink into close contact with spheres 14, thereby becoming greatly enlarged in the areas between the spheres, or over the points of tangency 38. At the same time, along longitudinal lines midway between the indentations 37, the counter thrust from the shrinking on both sides will tend to push the metal somewhat outwardly so that ridges 45 will form as shown in FIGS. 3 and 4.

It will be noted that ridges 45 are in straight rows, and these run the length of the tube from the inner faces of plugs 15 and 39. Since they are the result of the collapse of the tube in a regular pattern along lines of weakness impressed on the metal of the tube by the indentations 37, they are likewise in a complementary pattern over the resulting lines of comparative strength midway between the lines of weakness. Hence the lines of ridges 45 are straight, parallel, and equally spaced around the circumference of the tube. Because of these properties the lines of ridges impart to the tube a bending strength superior to that of tubes where the ridges are randomly oriented.

In carrying out the invention conditions should vary somewhat according to the thickness of the tube being fabricated, the diameter of the spheres and the like. In the case of 304 stainless steel tubing having an inner diameter of 0.325 inch and a wall thickness of one mil, we have found that indentations 37 to a depth of $\frac{1}{32}$ of an inch lead to good results when followed by hydrostatic pressure of 20,000 p.s.i. The composition of 304 stainless steel may be found in the 1948 Metals Handbook of The American Society for Metals, Cleveland, 1948 edition, page 554.

For heavier tubes deeper indentations may be advisable, and greater hydrostatic pressures. Thus for a 304 stainless steel having an inner diameter of one-half inch and a $\frac{1}{16}$ inch wall thickness hydrostatic pressure of 30,000 p.s.i. is preferred. Adjustments should, of course, be made for the ductility of the metal; aluminum and aluminum base alloy tubes, for example, require less pressure than tubes of stainless steel, carbon steel, zirconium and zirconium alloys.

Our improved peas-in-a-pod fuel element will probably find most applications in reactors having gaseous coolants such as steam. The uneven conformation of the outside of elements of this type creates turbulence in the coolant, and while this is objectionable in some liquid-cooled reactors, it can be advantageous in gas-cooled reactors where the turbulence breaks up an insulating layer of gas next to the elements. In any event, whether their turbulence characteristics are advantageous or otherwise, our straight-ridged or straight-finned fuel or blanket elements have sufficient mechanical strength that they may be used in nuclear reactors.

EXAMPLE I

A tube of 304 stainless steel having an inner diameter of 0.325" and a wall thickness of 1 mil was filled with spheres 14 having diameters of 0.322". The spheres were brought into tangency by placing the tube within the bore 12 of fitting 11 introducing plugs which also acted as stops. These were scribed at the lines where they entered the two ends of the tube 13.

The holes were 0.322" apart, center to center, and the centers were brought directly above the points of tangency 38 between the spheres 14 by adjusting the plugs. A punching tool 34, having a lower shaft 36 one-thirty-second inch longer than lower bore 33, was successively placed in each hole 30 and tapped with a hammer, thereby making along the portion of the tube between the plugs a straight line of indentations $\frac{1}{32}$" deep.

The tube was rotated through 90 degrees in the bore 12 and a second line of indentations was made in the same way. This was repeated twice more; the plugs, or stops, were removed and the tube was withdrawn from the horizontal bore 12. The plugs were reinserted into the ends of the tube 13 as far as the scribed marks, and short lengths of tightly fitting rubber hose were then placed over the junctions between the stops and the tube ends, thereby re-orienting the spheres in the same manner as they had been in the fitting 11 and making the tube fluid-tight.

The tube was then subjected to hydrostatic pressure in oil at 20,000 p.s.i. The tube collapsed at the indentations and came into close contact with the spheres 14, leaving midway between the collapsed portion four straight rows of ridges 45 along the entire length of the tube between the ends of the plugs. The rows were parallel and 90 degrees apart. The tube was straight over-all and had substantial resistance to bending.

EXAMPLE II

A tube of 304 stainless steel having an outer diameter of $\frac{9}{16}$" and an inner diameter of $\frac{1}{2}$" was filled with tangent steel spheres $\frac{15}{32}$" in diameter. The tube was placed within bore 12 of fitting 11 and plugs which also acted as stops were inserted to bring the spheres into tangency. The holes of the fitting were $\frac{15}{32}$" apart and the stops were adjusted to bring their centers directly above the points to tangency between the spheres. The stops were scribed in the same manner as in Example I. Four straight, parallel rows of indentations $\frac{1}{32}$" deep were made 90 degrees apart over the tube between the ends of stops in the same manner as in Example I, and the tube was sealed in the same manner as in that example.

The tube was then pressurized in oil at 30,000 p.s.i. The walls of the tube collapsed at the indentation 37 as in Example I, and four straight parallel rows of ridges appeared between the ends of the stops, or plugs, the rows being 90 degrees apart. The tube was straight and showed good resistance to bending.

It will be understood thatt he invention is not to be limited to the details given herein but that it may be modified within the scope of the appended claims.

The embodiments of the invention in which an exclusive property or privilege is claimed are defined as follows:

1. A method of making a nuclear reactor element, comprising filling a tube with a plurality of tangent geometric shapes having at least one diameter about equal to the inner diameter of the tube, slightly indenting the walls of the tube at equal distances along a plurality of straight, parallel, equally spaced longitudinal lines along a substantial midportion of its length, sealing the ends of the tube, the places where the tube has been indented all lying in the same planes normal to the axis of the tube as the points of tangency between the said shapes, and subjecting the tube so indented to isostatic pressure sufficient to collapse the walls of the tube at the indented places so as to bring them into close contact with the shapes and to produce continuous straight lines of equally spaced longitudinal ridges between the indented places, the said lines of ridges extending over the entire said midportion of its length.

2. The method of claim 1 where the geometric shapes are spheres.

3. Apparatus for making a nuclear reactor element, comprising a fixture containing a horizontal bore adapted to receive a tube and a straight row of equally spaced vertical holes leading into the horizontal bore, the spacing between the centers of the said holes being about equal to the diameter of the said horizontal bore, said holes having an upper vertical bore and a lower vertical bore of lesser diameter than the upper bore and an annular shoulder of uniform width therebetween, stops within each end of the horizontal bore adapted to hold geometric shapes in a fixed position with respect to said vertical holes, a punching tool having an upper shaft snugly slidable within and substantially longer than said upper vertical bore and a lower shaft snugly slidable within and slightly longer than said lower vertical bore, and means for exerting isostatic pressure on the tube to collapse its walls.

References Cited

UNITED STATES PATENTS

| | | | |
|---|---|---|---|
| 2,856,340 | 10/1958 | Wigner et al. | 176—76 |
| 3,129,140 | 4/1964 | Stohr et al. | 176—76 |
| 2,988,812 | 6/1961 | Ohlinger | 29—517 |
| 3,152,392 | 10/1964 | Coppack et al. | 29—517 |
| 2,881,646 | 4/1959 | Farr et al. | 29—243.5 |
| 3,111,867 | 11/1963 | Riggio | 29—243.5 |
| 2,378,655 | 6/1945 | Popp | 29—517 X |
| 3,125,493 | 3/1964 | D'Amore | 176—76 |
| 3,192,621 | 7/1965 | Bauer et al. | 29—510 |

CHARLIE T. MOON, *Primary Examiner.*

U.S. Cl. X.R.

29—510, 516, 243.5; 72—358, 463